United States Patent [19]

Barcomb et al.

[11] Patent Number: 5,238,565
[45] Date of Patent: Aug. 24, 1993

[54] LIQUID FILTRATION APPARATUS WITH ADJUSTABLE MEDIA GUIDE AND IMPROVED SEGREGATION OF CLEAN AND CONTAMINATED LIQUID

[75] Inventors: Lyle B. Barcomb, N. Syracuse; Joseph A. ElHindi, Fayetteville; Richard J. Cross, Waterville, all of N.Y.

[73] Assignee: Filter Tech, Inc., Manlius, N.Y.

[21] Appl. No.: 770,910

[22] Filed: Oct. 4, 1991

[51] Int. Cl.$^5$ ............................................. B01D 33/04
[52] U.S. Cl. ................................. 210/387; 210/401
[58] Field of Search ........................ 210/387, 400, 401

[56] References Cited

U.S. PATENT DOCUMENTS

| | | | |
|---|---|---|---|
| 3,601,039 | 8/1971 | Schover | 210/400 |
| 3,704,787 | 12/1972 | Norton | 210/387 |
| 3,876,547 | 4/1975 | Kaess | 210/401 |
| 4,137,169 | 1/1979 | El-Hindi | 210/400 |
| 4,220,539 | 9/1980 | Lee | 210/387 |
| 4,731,188 | 3/1988 | Johnson et al. | 210/400 |

Primary Examiner—Ivars Cintins
Attorney, Agent, or Firm—Charles S. McGuire

[57] ABSTRACT

Liquid filtration apparatus including an endless chain movable in upper and lower runs through a tank and carrying a continuous web of media on the upper run which passes over a guide roller at the upper rear of the tank, under relatively large diameter guide wheels and over driven guide sprockets at the upper front of the tank. The chain and media also pass over an idler roller between the guide wheels and the driven sprocket. The shaft of the idler roller is adjustably positioned in horizontal slots in the tank side walls to change the vertical angle of the media as it exits the pool of dirty liquid. When the media is at a steep angle a greater head of dirty liquid may be maintained, but contaminants may fall off the media, in which case the idler roller position is moved farther away from the guide wheels to provide a more gradual angle of media travel. Arcuate troughs are affixed to the tank side walls adjacent to and substantially concentric with the lower peripheries of the guide wheels to receive any dirty liquid which may leak through the edge seals or escape above the edge seals due to overfilling the dirty liquid pool.

18 Claims, 4 Drawing Sheets

LIQUID FILTRATION APPARATUS WITH ADJUSTABLE MEDIA GUIDE AND IMPROVED SEGREGATION OF CLEAN AND CONTAMINATED LIQUID

BACKGROUND OF THE INVENTION

The present invention relates to novel and improved apparatus for removing contaminants from liquids, typically those used as coolants and lubricants in machining operations, or the like. More specific features of the invention, in the context of a liquid filtration system, relate to means for adjustably establishing the vertical angle of travel of a movable filter media to improve filtering efficiency, and to improved means for preventing unfiltered liquid from mixing with filtered liquid.

Among the filtration systems commonly used to remove solid contaminants from liquids for recycling in machine tool operations are those wherein an endless chain or belt is moved through a tank to which contaminated liquid is supplied. A layer of liquid-pervious media is carried on the upper surface of the chain, fresh media being supplied from a roll supported at the rear end of the tank and used media discharged at the front end. The media travels downwardly to some extent from the rear end as it enters the tank, and thence upwardly to the front end. Dirty liquid is contained in a pool on the upper surface of the media between the tank side walls or other side structure and sealing means are provided to prevent escape of dirty liquid at the lateral edges of the media. Contaminants are deposited on the surface of the media as it travels through the tank, the clean liquid which passes through the media being collected in the lower part of the tank and pumped back to the location of the machining operation.

Contaminants form a bed or "cake" as they collect on the surface of the media. As the thickness of the cake increases, filtering efficiency is enhanced by retaining smaller particles on the cake itself. However, the flow rate through the media decreases proportionately to the increase in cake thickness if the pressure differential between the dirty and clean liquid compartments remains constant. Thus, it is desirable to maintain the head of dirty liquid as high as possible, particularly in so-called gravity filters which do not include means for creating a vacuum (i.e, a pressure below atmospheric) in the clean liquid compartment. Since the upper level of the dirty liquid pool cannot exceed the lowest height of the seals along the lateral edges of the pool, it is apparent that a deeper pool of dirty liquid may be maintained by providing the highest practical level of edge sealing.

In typical forms of so-called flat bed filtration apparatus, as seen, for example, in U.S. Pat. Nos. 3,704,787, 3,876,547 and 4,137,169, a seal to prevent dirty liquid from leaking past the lateral edges of the media into the clean liquid below is provided by cooperative structure affixed to the tank wall and to the movable chain and/or media. In U.S. Pat. No. 4,220,539 the media is wider than the chain and outer portions of both the media and the chain rest upon shelves extending inwardly from opposite side walls of the tank to form a plurality of transversely spaced dams providing a labyrinthine leakage path in combination with leakage collecting inclined troughs on each side draining into a contaminated liquid chamber. While such edge sealing and leakage collecting troughs are effective for use in flat bed filtration systems, they would not be suitable for use in apparatus wherein the edge seals are provided by contact between moving media and rotating guide wheels. In another prior art type of filtration apparatus, with which the present invention is principally concerned, edge seals are provided by direct contact of the media upper surface with lower peripheral portions of guide wheels under which the media and upper run of its supporting chain pass. Thus, the height of the edge seals, and corresponding maximum depth of the dirty liquid pool, is greatest when the media contacts the guide wheels over the largest possible portion (i.e., approaching 180°) of their lower peripheries. This means, of course, that the vertical angle of travel of the media as it exits the pool of dirty liquid approaches 90°. However, when the cake builds up rather rapidly it may fall off the surface of a steeply inclined media back into the dirty liquid pool rather than exiting the tank with the used media. While a certain amount of cake build-up is desirable for reasons previously explained, the rate of liquid flow is unacceptably slow when the amount of contaminants in the dirty liquid compartment becomes too great. Furthermore, although the operation is normally controlled to ensure that the height of the dirty liquid pool does not exceed that of media-guide wheel engagement, some dirty liquid occasionally spills around the sides and some may also leak through the normally sealed engagement of the media surface and peripheries of the guide wheel.

It is an object of the present invention is to provide liquid filtration apparatus wherein the depth of the dirty liquid pool may be selectively controlled, consistent with the requirement for contaminant removal via a filter media interposed between dirty and clean liquid compartments. More specifically, this object of the invention is concerned with providing means for readily adjusting the angle or slope of a continuous, traveling web of filter media as it exits a pool of dirty liquid in filtration apparatus.

An additional object of the invention is to provide, in filtration apparatus wherein edge sealing is accomplished through contact of the media upper surface with a pair of guide wheels at each side of the dirty liquid pool, improved means for preventing liquid which escapes from the dirty liquid pool from mixing with the clean filtrate.

Other objects will in part be obvious and will in part appear hereinafter.

SUMMARY OF THE INVENTION

The invention is employed in liquid filtration apparatus having a number of conventional features including a tank having front, rear, bottom and opposite side walls and an open top. An endless belt or chain is supported within the tank for travel around a succession of guide rollers and wheels, one of which is connected to a motor for imparting movement to the chain about the path established by the rollers and wheels. A roll of filter media is supported adjacent one end of the tank, and is fed from the roll as a continuous web onto the upper surface of the upper run of the chain.

The upper run of the chain, carrying the media on the upper surface thereof, begins at the upper, rear end of the tank, passing over rotary guide means and traveling in a generally downward direction. The chain and media pass under a pair of relatively large diameter guide wheels, respectively positioned inwardly adjacent opposite side walls of the tank, thence generally upwardly and over the driven roller. After passing over the driven roller at the upper, front end of the tank, the endless chain again travels generally downwardly and back toward the rear end, while the used media is removed from the chain and separately collected. Dirty liquid is supplied to an upper compartment of the tank, above the media and upper run of chain, and the clean liquid or filtrate which has passed through the media is collected in and pumped from a lower compartment. Lateral edges of the dirty liquid pool are sealed by contact of the media with lower portions of the guide wheel peripheries. All of the foregoing are features of prior art filtration apparatus.

According to one aspect of the present invention, the path of the chain and media between the guide wheels and the driven roller is controlled by an intermediate idler roller carried on a shaft extending across the tank. Opposite end portions of the shaft are mounted in elongated, horizontal slots in the tank side walls. The position of the shaft ends may be releasably fixed at or near the ends of the slots nearest the guide wheels, in which case the chain and media travel upwardly from the guide wheels to exit the dirty liquid pool at a steep angle, thereby permitting the deepest possible pool (i.e., the highest head) of dirty liquid. Alternatively, the shaft may be positioned at the end of the slots farthest from the guide wheels, in which case the chain and media travel upwardly at a far smaller angle. This lowers the edge seal area, thus requiring a shallower pool of dirty liquid but ensuring that the contaminants remain on the media as it leaves the tank rather than falling back into the dirty liquid pool. The adjustability of the angle of travel of the media as it leaves the pool of dirty liquid permits operation of the filtration system in the manner most advantageous for the process conditions at any given time.

In another aspect of the filtration apparatus, a pair of arcuate troughs are respectively affixed to and extend inwardly from the tank side walls. Each trough includes an inwardly and an upwardly extending portion, both of arcuate configuration, substantially concentric with and adjacent the lower peripheries of the guide wheels. Dirty liquid which leaks outwardly, past the normally sealed engagement of the media and the guide wheels, is caught in the troughs, as is any liquid which may escape at the sides due to overfilling the dirty liquid pool. The dirty liquid is drained from the troughs through openings in the tank side walls and returned to the dirty liquid pool in the upper part of the tank, rather than mixing with the clean filtrate below.

The structural and operational features of the invention through which such advantages are attained will be more fully understood and appreciated from the following detailed description, taken in conjunction with the accompanying drawings, wherein:

DETAILED DESCRIPTION

Figure 1:
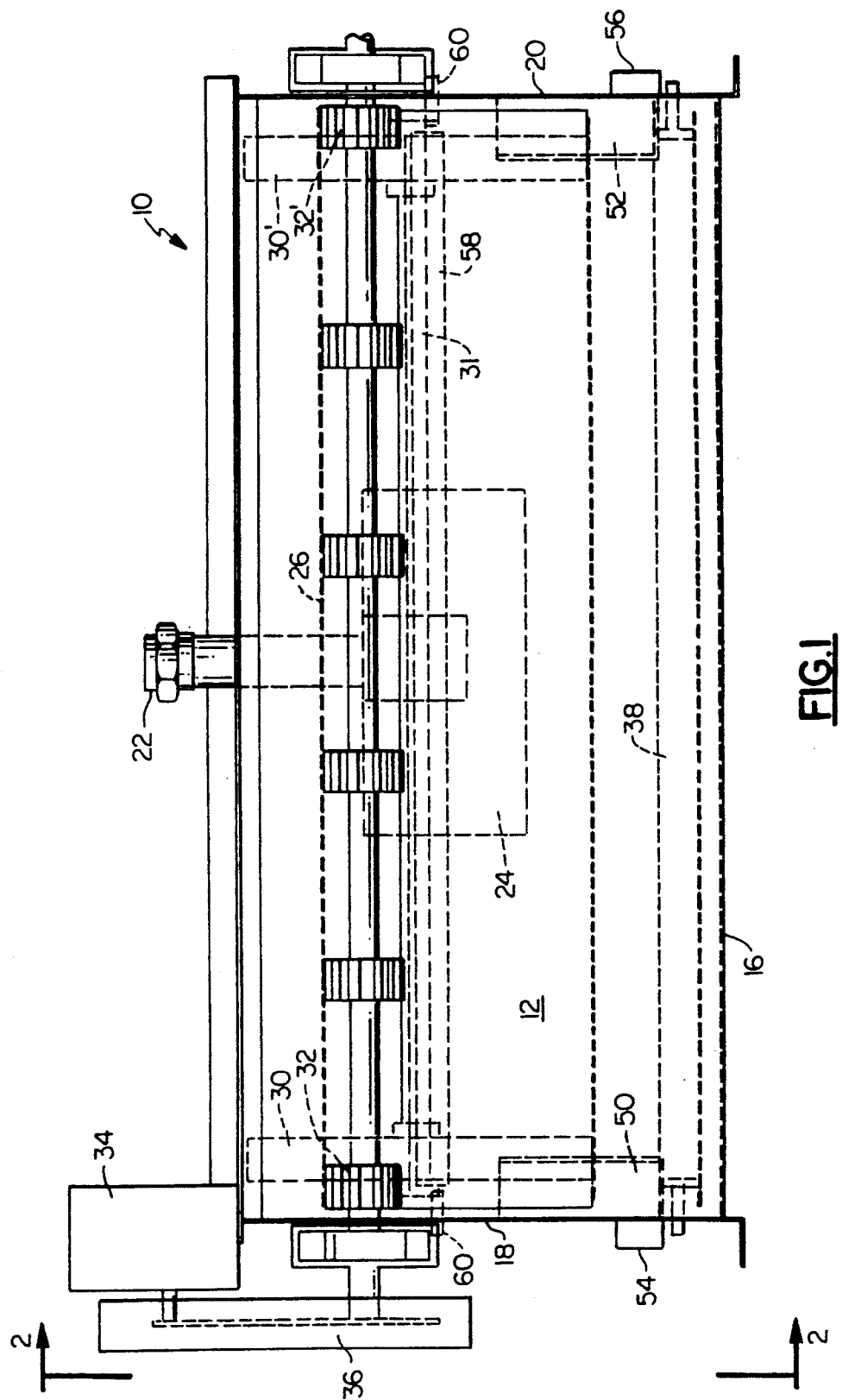
FIG. 1 is a front elevational view of liquid filtration apparatus embodying the invention.

The filtration apparatus of the invention may be incorporated in a variety of systems which separate solids and other foreign matter from process liquid. The liquid and/or solids may then be recovered for reuse in the same or other processes. A common example, which is one of the principal intended uses of the invention, is the recovery of liquid used to cool and lubricate the work in metal drilling, grinding, shaping, drawing and other metal working operations.

Referring now to the drawings, all views of which may be considered as somewhat diagrammatic, the liquid filtering system includes tank 10, having front wall 12, rear wall 14, bottom wall 16 and opposing side walls 18 and 20 in which the filtration process is performed. Contaminated liquid is supplied through inlet 22 to distribution chamber 24 and is deposited in the upper, open portion of tank 10. An endless, open belt or chain 26, e.g., of the type disclosed in U.S. Pat. No. 3,876,547, is supported and guided for travel within tank 10 by a succession of wheels or rollers.

Figure 2:
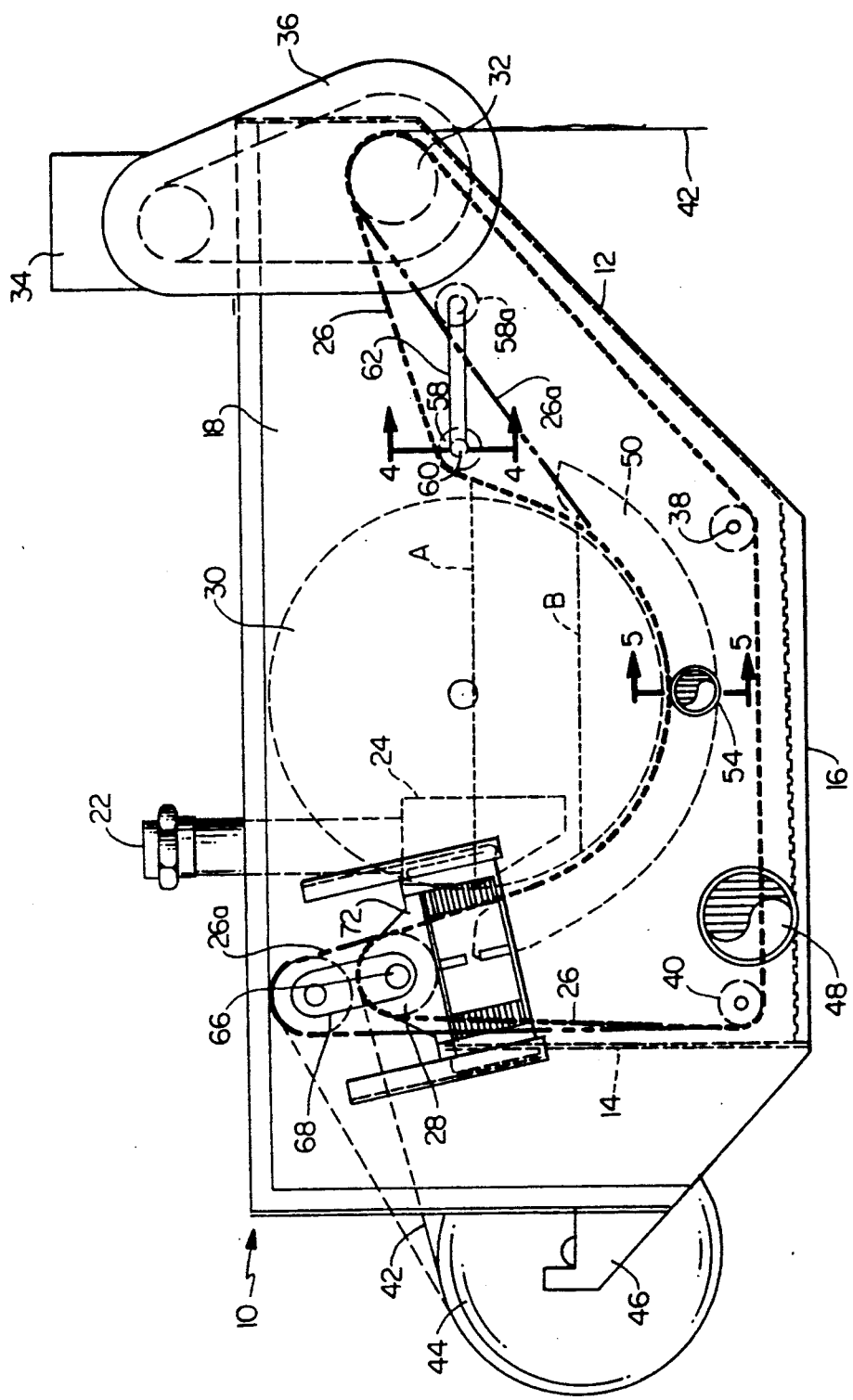
FIG. 2 is a side elevational view thereof.
Figure 3:
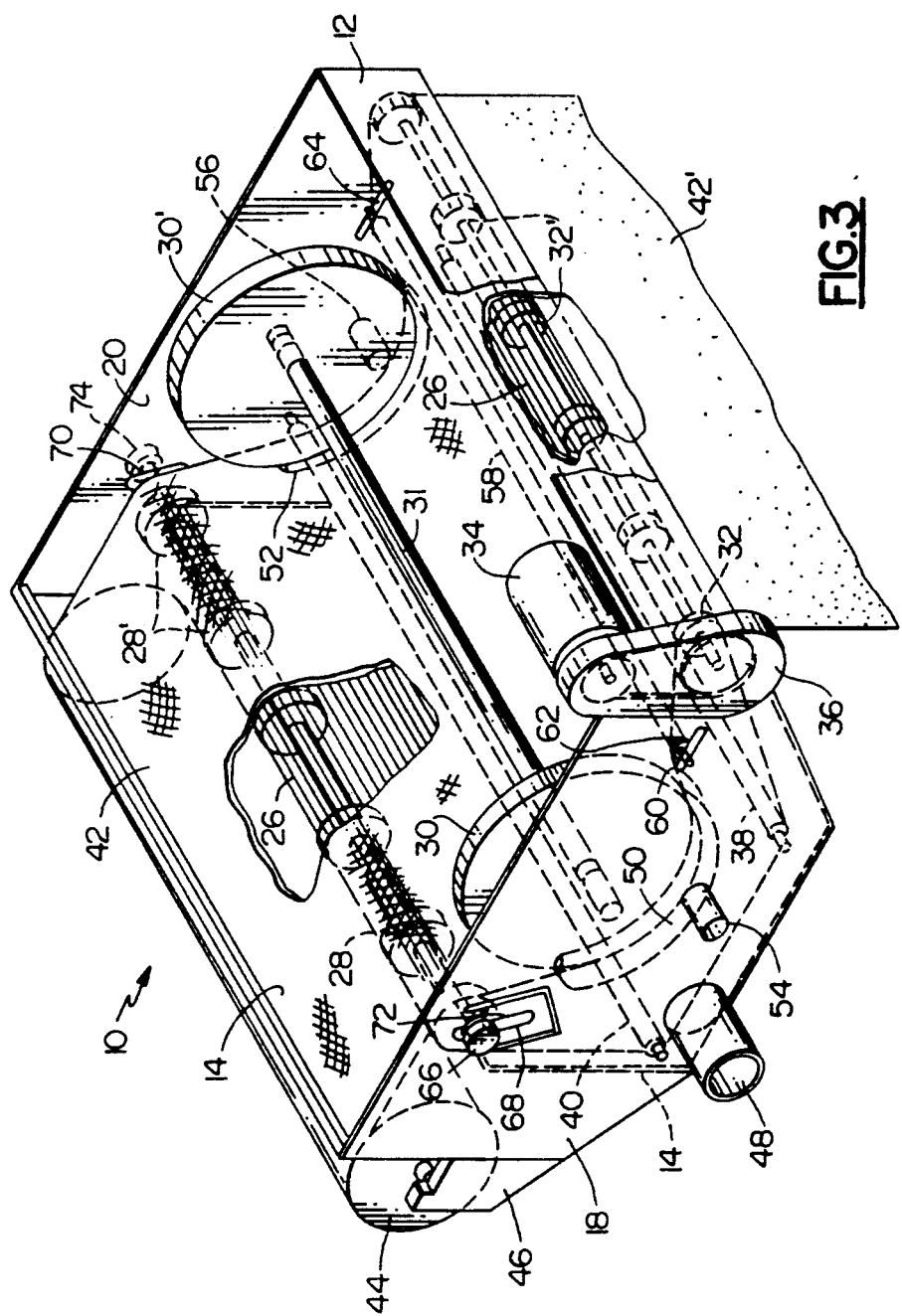
FIG. 3 is a perspective view of the apparatus.

Referring in particular to FIG. 2, it is seen that chain 26 begins the upper run of its path by passing over guide roller 28 at the upper, rear portion of the tank, and travels generally downwardly, passing under relatively large diameter guide wheel 30. Chain 26 then travels generally upwardly to the end of its upper run, where it passes over drive sprocket 32 which is driven at a desired speed by a suitable motor in casing 34, through rotary motion transfer means 36. The path of the lower run of travel of chain 26 is established by idler roller 38 and 40, extending across the lower portion of tank 10.

Solid contaminants are removed from the liquid deposited in tank 10 by a layer of liquid pervious, disposable filter media 42 which is drawn from a supply roll 44 and supported on the upper run of chain 26. Roll 44 of filter media is rotatably mounted on fixed supports 46 at the rear end of the tank, and used media 42', together with contaminants deposited thereon, is removed from chain 26 at the front end of the tank for disposal. Liquid which passes through media 42 and the underlying, open belt or chain 26 is collected in the lower portion of tank 10. Clean liquid is removed through outlet 48 for return to the same or other metal working process wherein it was originally used.

The pool of dirty liquid contained in the upper portion of tank 10 may have a maximum depth dependent upon the length of engagement of the lateral edges of media 42 with guide wheel 30 and the corresponding guide wheel 30' on the opposite side of tank 10. Guide wheels 30 and 30' are mounted inwardly adjacent side walls 18 and 20, respectively, on shaft 31 which is supported in suitable bearings in tank side walls 18 and 20. The dirty liquid is contained on the upper surface of media 42, between the opposing surfaces of guide wheels 30 and 30', and is prevented from flowing laterally out of the contained pool by tight engagement of the media surface with the peripheries of wheels 30 and 30' (see FIG. 4). Therefore, if the surface of the pool is higher than the area of engagement of the media and guide wheels, dirty liquid will spill out the sides of the upper compartment without being filtered.

Figure 4:
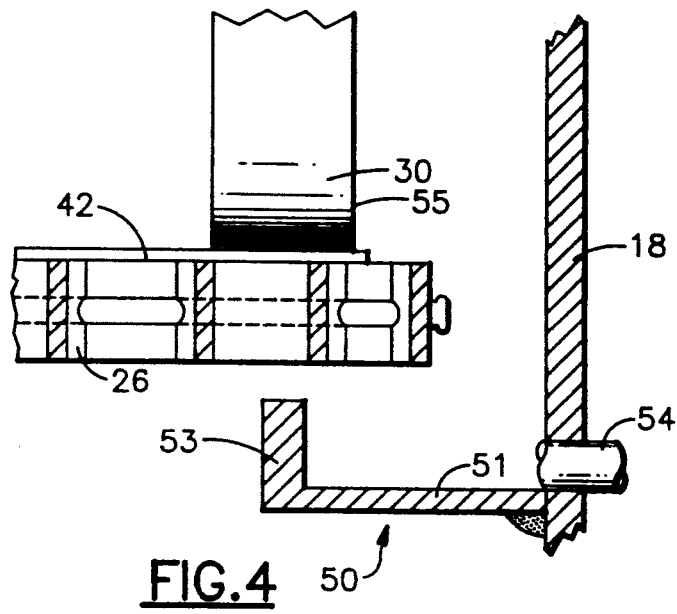
FIG. 4 is an enlarged, fragmentary, elevational view in section on the line 4—4 of FIG. 2.

In order to prevent dirty liquid which leaks through or spills over the edge seals from reaching the clean liquid compartment, arcuate overflow troughs 50 and 52 are secured to the inner surfaces of side walls 18 and 20, respectively, adjacent lower portions of guide wheels 30 and 30'. Dirty liquid which enters troughs 50 and 52 is removed through drain openings 54 and 56, respectively, and returned to the upper compartment of tank 10. As best seen in FIG. 4, trough 50 includes a first portion 51, welded or otherwise affixed to and extending horizontally inward from tank side wall 18, and a second portion 53 extending upwardly from the first portion. The upper edge of portion 53 is spaced a short distance from the lower side of chain 26 and is positioned inwardly of outer surface 55 of guide wheel 30. As seen in FIG. 2, trough 50 extends substantially concentrically about the lower periphery of wheel 30, trough 52 being of the same configuration as trough 50 and positioned in the same relationship to wheel 30'. The troughs extend about a sufficient portion of the guide wheels that any dirty liquid which may overflow above the edge seals will be received in the troughs.

Figure 5:
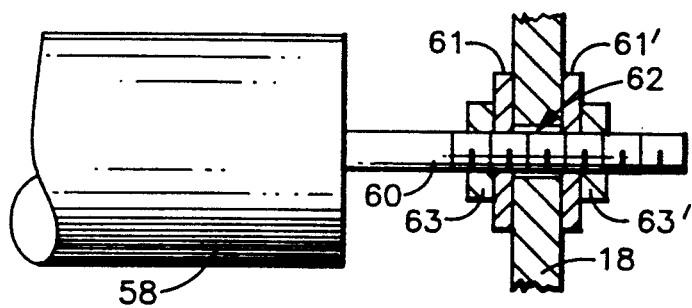
FIG. 5 is an enlarged, fragmentary, sectional view on the line 5—5 of FIG. 2.

Between guide wheels 30, 30' and drive sprockets 32, 32', chain 26 and media 42 pass over intermediate idler roller 58 mounted upon shaft 60, opposite ends of which extend through horizontally elongated slots 62 and 64 in tank side walls 18 and 20, respectively. Suitable means are provided to permit the ends of shaft 60 to be positioned adjacent either end of slot 62 and 64 or, if desired, at intermediate positions between the ends of the slots. Such means may take any of several suitable forms, a simple example being shown in FIG. 5. Shaft 60 is threaded at each end and extends closely but movably through slots 62 and 64. As seen in FIG. 5, washers 61 and 61' are placed on one end of shaft 60, respectively inside and outside side wall 18. Nuts 63 and 63' are threaded on shaft 60 so that, when the nuts are tightened by rotation in opposite directions, washers 61 and 61' are urged into tight engagement with side wall 18 and the position of shaft 60 is fixed until the nuts are loosened.

When shaft 60 is positioned at or near the left end, as viewed in FIG. 2, of slots 62 and 64, the path of chain 26 and media 42 is established so that the media edges contact the peripheries of guide wheels 30, 30' for nearly 180°. Consequently, the level of dirty liquid in the upper part of tank 10 may be as high as that indicated by dotted line A. While this provides the maximum head of liquid for optimum rate of flow through the media, it will be noted that the media is disposed at a steep vertical angle as it passes over roller 58. Contaminants which have collected on the media surface are thus subject to falling back into the pool of dirty liquid as the media exits the pool. While a certain amount of contaminant cake is desirable to increase filtering efficiency, as previously noted, it is nevertheless necessary to remove contaminants from the dirty liquid via the exiting media 42'.

When operating conditions are such that an excessive amount of contaminants are falling back into the dirty liquid pool, shaft 60 may be repositioned at or near the right end of slots 62 and 64, as seen in FIG. 2 where the adjustably positionable idler roller is indicated by reference numeral 58a. With roller 58 in this position, chain 26 and media 42 follow the path indicated by reference numeral 26a, at a vertical angle much reduced from that when shaft 60 positioned at or near the left end of slots 62 and 64. While this essentially ensures that contaminants will not fall off the media back into the dirty liquid pool, the maximum depth of the pool is reduced to a level corresponding to that indicated in FIG. 2 by dotted line B.

Since the length of the path of chain 26 and media 42 between guide wheels 30, 30' and drive sprockets 32, 32', changes as the axis of roller 58 is repositioned, the position of the axis of guide wheels 28, 28' is likewise adjustable. Shaft 66, which carries wheels 28, 28', extends through elongated slots 68 and 70 and is mounted in bearing supports 72 and 74, the position of which is adjustable in conventional fashion. When the position of shaft 60 is moved from the end of slots 62 and 64 nearest to guide wheels 30, 30' to the opposite end (i.e., from the left to the right end as viewed in FIG. 2), the length of the path of chain 26 and media 42 between guide rollers 30, 30' and drive sprockets 32, 32' is decreased. Accordingly, the position of shaft 66 is moved toward the upper end of slots 68 and 70 until the slack has been removed from the chain and media.

From the foregoing it will be seen that the invention provides novel and efficient liquid filtration apparatus including means permitting selective adjustment of the angle of vertical travel of the filter media as it exits the pool of dirty liquid, thereby allowing control of the maximum depth of the dirty liquid pool and prevention of contaminants from falling back into the dirty liquid pool. Means are also provided, in liquid filtration apparatus of the type wherein edge sealing of the dirty liquid pool is provided by engagement of the media with rotating guide wheels, to prevent dirty liquid which either overflows or leaks through the edge seals from mixing with the clean, filtered liquid.

What is claimed is:

1. Liquid filtration apparatus wherein solid contaminants are removed from liquid by passage thereof through a liquid-pervious media, said apparatus comprising:
   a) a tank having front, rear, bottom and opposite side walls;
   b) an endless, open-mesh chain;
   c) rotary guide means establishing a path of travel including upper and lower runs of said chain, said upper run extending from the upper rear of said tank, generally downwardly and forwardly at a first vertical angle to a lowermost position of said upper run, thence generally upwardly and forwardly at a second vertical angle from said lowermost position toward the upper front of said tank;
   d) means for feeding said media from a supply thereof in a continuous web from a position rearwardly adjacent said upper rear of said tank for support upon the upper surface of said upper run of said chain, said tank being divided by said upper run of said chain into upper and lower compartments for dirty and clean liquid, respectively;
   e) drive means for imparting movement to said chain through its endless path, said chain carrying said media across said upper run for discharge at the end thereof; and
   f) adjustment means for selectively varying said second vertical angle between relatively steep and relatively shallow angles.

2. The invention according to claim 1 wherein said rotary guide means includes first and second rotary guide means over each of which said chain passes at the beginning and end, respectively, of said upper run, and said adjustment means comprises at least one member over which said chain passes between said lowermost position and said second guide means.

3. The invention according to claim 2 wherein said one member comprises a third rotary guide means having an axis of rotation extending laterally across said tank, and said adjustment means further comprises means for selectively moving said third guide means axis between first and second positions in a direction transverse to said upper run of said chain.

4. The invention according to claim 3 wherein said third guide means comprises a roller extending across substantially the full width of said tank and a shaft extending from each end of said roller and through an elongated slot in each of said opposite side walls, said positioning means comprising releasable means for fixing the position of said shaft at desired locations along said slots.

5. The invention according to claim 2 and further including means independent of said adjustment means for selectively changing the path of said chain to compensate for like changes in said path made by said adjustment means.

6. The invention according to claim 5 wherein said independent means comprise said first rotary guide means and further means for selectively moving the axis of said first rotary guide means between first and second positions in a direction transverse to said upper run of said chain.

7. The invention according to claim 1 wherein said rotary guide means comprise first and second rotary guide means over each of which said chain passes at the beginning and end, respectively, of said upper run, and third rotary guide means under which said chain passes to establish said lowermost position thereof, each of said first, second and third rotary guide means being rotatable about parallel axes extending laterally across said tank.

8. The invention according to claim 7 wherein said third rotary guide means comprise a pair of guide wheels respectively mounted interiorly adjacent said tank side walls and having diameters substantially equal to one another and significantly greater than the diameters of said first and second rotary guide means, engagement of said guide wheels with the media on said upper run of said chain providing edge seals along each lateral edge of said media.

9. The invention according to claim 8 wherein said drive means comprises an electric motor for imparting rotation to said second rotary guide means, and means for driving engagement of said second rotary guide means with said chain.

10. The invention according to claim 9 wherein said adjustment means comprises an idler roller over which said chain passes between said third and said second rotary guide means, said idler roller having an axis of rotation extending laterally across said tank, said adjustment means further comprising means for selectively changing the position of said idler roller axis in a direction transverse to said upper run of said chain.

11. The invention according to claim 8 and further including means for preventing dirty liquid from said upper compartment which leaks through or spills over said edge seals from mixing with clean liquid in said lower compartment of said tank.

12. The invention according to claim 11 wherein said means for preventing comprise a pair of arcuate troughs respectively extending substantially concentrically about and adjacent lower peripheral portions of said guide wheels.

13. In liquid filtration apparatus including:
a tank having front, rear, bottom and opposite side walls;
an endless, open-mesh chain and drive means for moving said chain through its endless path;
first, second and third rotary guide means establishing an upper urn of said chain and fourth rotary guide means establishing a lower run, said chain passing over said first and third rotary guide means at the beginning and end, respectively, of said upper run, and under said second rotary guide means to establish a lowermost position of said upper run, said second rotary guide means comprising a pair of guide wheels respectively mounted inwardly adjacent said tank side walls;
means for feeding liquid-pervious media in a continuous web for support upon and movement with said upper run of said chain, said tank being divided by said upper run of chain and media into upper and lower compartments for dirty and clean liquid, respectively, and engagement of said guide wheels with the media on said upper run of chain providing edge seals along each lateral side of said upper compartment;
the improvement comprising:
means comprising a pair of arcuate troughs respectively extending substantially concentrically about and adjacent lower peripheral portions of said guide wheels for preventing dirty liquid from said upper compartment which leaks through or spills over said edge seals from mixing with clean liquid in said lower compartment.

14. The invention according to claim 13 wherein said troughs are respectively, fixedly attached to the interior surfaces of said tank side walls.

15. The invention according to claim 14 and further including a drain opening extending through each of said side walls and communicating with said troughs at substantially the lowest point thereof.

16. The invention according to claim 15 wherein said troughs comprise first portions affixed to and extending inwardly from respective ones of said side walls and arcuately in substantially concentrically spaced relation to the lower peripheries of said guide wheels, and second portions extending from said first portions toward the axis of said guide wheels.

17. The invention according to claim 16 wherein said second portions extend from said first portions toward and have terminal edges closely adjacent said lower peripheries of said guide wheels.

18. The invention according to claim 17 wherein said terminal edges are positioned laterally inwardly of the outer surfaces of said guide wheels.

* * * * *